United States Patent [19]
Miller

[11] Patent Number: 4,718,033
[45] Date of Patent: Jan. 5, 1988

[54] INTERMEDIATE DECIMAL CORRECTION FOR SEQUENTIAL ADDITION

[75] Inventor: Terrence C. Miller, Menlo Park, Calif.

[73] Assignee: Hewlett-Packard Company, Palo Alto, Calif.

[21] Appl. No.: 750,116

[22] Filed: Jun. 28, 1985

[51] Int. Cl.$^4$ .............................................. G06F 7/50
[52] U.S. Cl. .................................................. 364/771
[58] Field of Search .............................. 364/771, 772

[56] References Cited
U.S. PATENT DOCUMENTS

| | | | |
|---|---|---|---|
| 3,958,112 | 5/1976 | Miller | 364/771 |
| 4,041,290 | 8/1977 | Fressineau et al. | 364/771 |
| 4,197,587 | 4/1980 | Stettmaier et al. | 364/771 |

OTHER PUBLICATIONS

Guyton, "Simplifying Sum-Correction Logic for Adding two BCD Numbers", *Electronics*, vol. 47, No. 11, p. 108, May 30, 1974.

*Primary Examiner*—David H. Malzahn
*Attorney, Agent, or Firm*—Leslie G. Murray

[57] ABSTRACT

Apparatus is provided to restore an excess six correct to every digit of an intermediate result which did overflow during the previous addition operation during a sequence of repeated BCD addition operations. A carry register is defined to store and feedback logical signals indicative of the occurance of an overflow event.

1 Claim, 3 Drawing Figures

| # INTERMEDIATE DECIMAL CORRECTION FOR SEQUENTIAL ADDITION

BACKGROUND OF THE INVENTION

The present invention relates generally to performing addition operations in an arithmetic logic unit (ALU) in a computing system and more particularly to sequential adding operations on one or more binary coded decimal (BCD) operands.

Most calculations performed in an ALU can be accomplished utilizing simple addition. Multiplication, for example, is a sequence of repeated addition operations on an operand. Decimal numbers or data are generally expressed in groups of four binary bits per digit (BCD). Since the four binary bits are capable of coding up to a hexadecimal digit, if used to code a decimal digit, the BCD digit has to be prebiased by adding an excess six to the digit prior to performing additional operations. At the completion of the additional operation the excess six previously added has to be subtracted out from all of the digits in which a carry did not result from the addition operation. If a calculation requires a sequence of repeated addition operations, the excess six has to be subtracted out from the resultant of the first operation and then has to be added in for the next addition operation, thus two intermediate operations are required between each addition operation in a sequence of repeated addition operations.

SUMMARY OF THE INVENTION

In accordance with the principles of the present invention, apparatus is provided which during a sequence of repeated decimal addition in BCD format adds in an excess six (BCD) to every BCD digit in the resultant of the immediately prior addition operation which overflowed or carried during the addition operation. The apparatus includes means which provides a logic signal indicative of the occurrence of a carry event resulting from an addition operation for each BCD digit. By adding the excess six only to the BCD digits which carried, the two intermediate steps required by the prior art are reduced to one.

DESCRIPTION OF THE PREFERRED EMBODIMENT

Figure 1A:
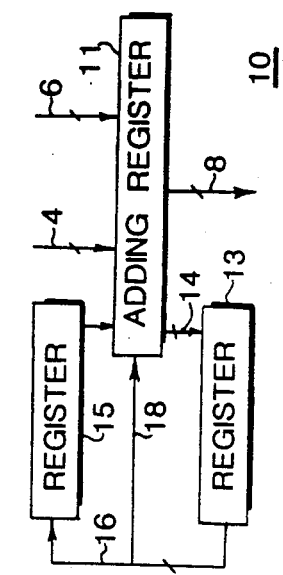
FIG. 1A illustrates an arithmetic logic unit and associated storage registers to implement the principles of the present invention.
Figure 1B:
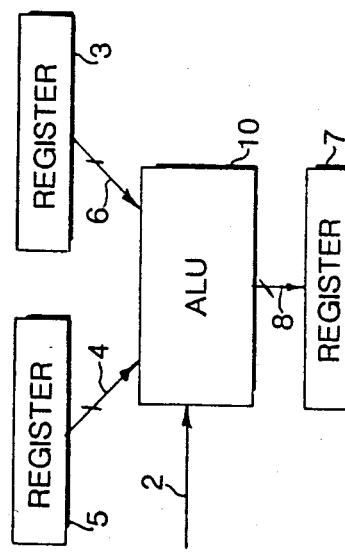
FIG. 1B is a block diagram of the arithmetic logic unit shown in FIG. 1A.

Referring now to FIG. 1A and 1B, arithmetic logic unit (ALU) 10 receives a first operand from a storage register 5, a second operand from a storage register 3 and performs a desired operation outputting the results on line 8 to be stored in storage register 7. The ALU 10 comprises an adding register 11 which receives the first and second operands on lines 4 and 6 respectively, a carry storage register 13 and an excess six storage register 15. Control signal on line 2 direct the ALU 10 to perform addition or other desired operations. Data are stored and used in BCD format. BCD format may be used, for example, to encode eight-bit ASCII code (hexadecimal) or numerical data. If decimal numerical data is BCD encoded, the data word has to be prebiased prior to performing arithimetic calculations with the data in order to get the proper carries. Prebiasing a data word by adding six to it is referred to as an excess six correction. The excess six correction must be substracted out at the completion of the sequence of addition operations.

Figure 2:
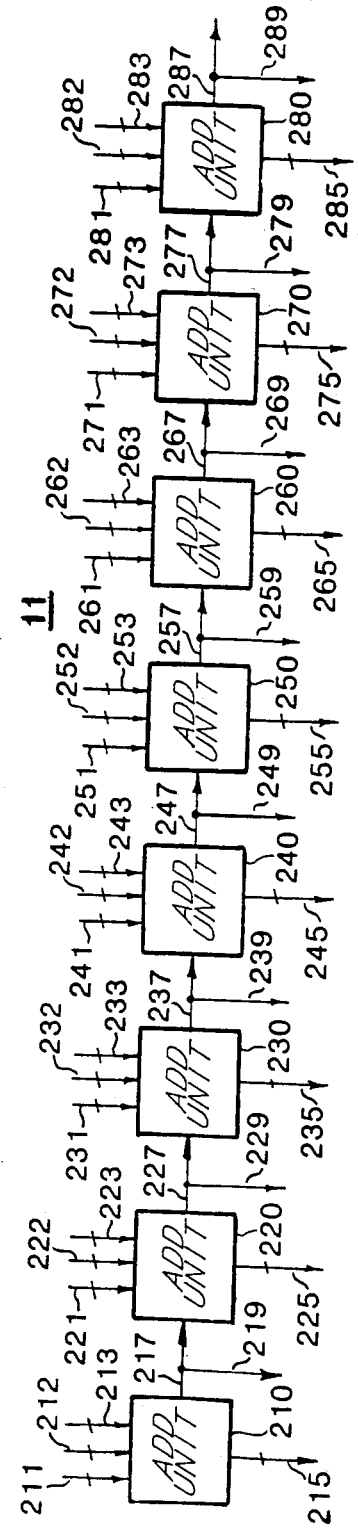
FIG. 2 is a more detailed diagram of the adding register shown in FIG. 1B.

Referring now to FIG. 2, the addiing register 11 is subdivided into units, each unit holding four bits. FIG. 2 illustrates an adding register for a 32 bit word and is divided into eight units 210, 220, 230, 240, 250, 260, 270 and 280. Each unit from units 210, 220, 230, 240, 250, 260, 270 and 280 receives four bits from register 5 and four bits from register 3. Each unit from units 210, 220, 230, 240, 250, 260, 270 and 280 provides a carry signal to be stored in register 13 and a resultant output to be stored in register 7. Line 4 (as shown in FIG. 1A) comprise the lines labeled 211, 221, 231, 241, 251, 261, 271 and 281, and each transfers four bits from register 5. Line 6 (as shown in FIG. 1B) comprise the lines labeled 213, 223, 233, 243, 253, 263, 273 and 283 and each transfers four bits from register 3. The lines labeled 217, 227, 237, 247, 257, 267, 277 and 287 comprise the carry lines between each unit and couple a carry signal from one unit to the next when a carry or overflow event occurs. Line 14 (as shown in FIG. 1B) comprises 219, 229, 239, 249, 259, 269, 279, and 289 and each couples the carry signal from its respective unit to the carry storage register 13 (as shown in FIG. 1B). Line 8 (as shown in FIGS. 1A and 1B) comprises lines 215, 225, 235, 245, 255, 265, 275 and 285 and each transfers four bits of the resultant to the storage register 7. The lines labeled 212, 222, 232, 242, 252, 262, 272 and 282 each transfers four bits from the excess six storage register 15 (as shown in FIG. 1B).

Referring now to FIGS. 1A, 1B and 2, each of the groups of four bits transferred to the adding register 11 constitute BCD digits. When it is desired to add a first, second, third and fourth operand, the first operand is transferred from register 5 to register 11 via line 4, each BCD digit of the data word stored in register 5 being transferred to a proper one of units 210, 220, 230, 240, 250, 260, 270 and 280 of register 11. The first operand is then prebiased by coupling BCD six via lines 212, 222, 232, 242, 252, 262, 272 and 282 from register 15 to each unit in register 11. Each BCD digit has six added to it and the resultant is retained in register 11.

When numbers are encoded in BCD format each four bit unit should contain a number in the range from zero (0000 base 2) to nine (1001 base 2). When the adding register 11 performs the above prebias operation, the carry lines 217, 227, 237, 247, 257, 267, 277 and 287 from units 210, 220, 230, 240, 250, 260, 270 and 280 are checked for a logic one. If any of the carry lines are at a logic one, then a carry or overflow event has occurred in the corresponding unit indicating that the BCD digit entered in that unit is either incorrect (i.e., greater than nine) or improperly coded.

The second operand from register 3 is now transferred to register 11 via lines 213, 223, 233, 243, 253, 263, 273 and 283 and added to the prebiased first operand, the resultant being retained in the adding register 11 for the next operation. Any of the units which overflowed output a logic one on the corresponding carry line. Carry signals on the carry lines are transferred to the carry register 13 via lines 219, 229, 239, 249, 259, 269, 279 and 289. Prior to adding the third operand to the number in register 11, the prebias operation has to be performed again. Each unit of units 210, 220, 230, 240 250, 260, 270 and 280 which did not carry or overflow during the previous addition operation retains the excess six. The only BCD digits which have to be prebiased again are the digits contained in the units which overflowed or carried. Each carry signal in carry register 13 is checked for a logic one, and the excess six is transferred from register 15 to each corresponding unit of units 210, 220, 230, 240, 250, 260, 270 and 280 which has a logic one stored in register 13. The third operand is now transferred from a register (not shown) to register 11 and the addition operation repeated. Prebiasing of the digits in the units which overflowed is repeated and the fourth operand is transferred to register 11 and the addition operations repeated with the resulting being retained in register 11. When the desired operands have been added together, the excess six added in, now has to be subtracted out from the BCD digits in each unit which did not carry or overflow.

I claim:

1. Apparatus for performing a sequence of repeated addition operations on a multiplicity of binary coded operands, said apparatus comprising:

addition means for receiving the multiplicity of operands, one at a time, in serial fashion and for receiving a prebiasing value, each operand comprising a plurality of binary coded digits, said addition means including a plurality of units, each unit corresponding to one digit of said plurality of digits.

Input means for inputting a multiplicity of add signals, each unit of said plurality of units responsive to a first add signal of said multiplicity of add signals for receiving one digit of said plurality of digits comprising a first operand of said multiplicity of operands and for receiving a binary coded digit representing said prebiasing value and for adding said received digits to produce and retain one digit of a first intermediate resultant, and each unit receiving one digit of a second operand of said multiplicity of operands for adding said digit to the digit of the first intermediate resultant to produce and retain one digit of a subsequent intermediate resultant.

each unit of said plurality of units responsive to subsequent add signals of said multiplicity of add signals to receive one digit from a subsequent operand of said multiplicity of operands for adding said digit to the digit of the intermediate resultant contained within each of said units to provide and retain one digit of a subsequent intermediate result;

a plurality of output means, each of said plurality of output means coupled to and associated with one unit of said plurality of units, each of the output means for providing a carry signal, said carry signal indicative of a carry from the associated unit into an adjacent unit;

register means coupled to said plurality of output means including a plurality of storage cells, each storage cell coupled to one of the output means for storing the carry signal from the associated unit; and feedback means coupled to said register means and to said addition means for providing a control signal, said addition means responsive to the control signal for selectively adding a binary coded digit representing said prebiasing value to each digit of the intermediate resultant contained in the units which carried to an adjacent unit during the immediately previous addition operation, said control signal derived from said carry signals stored in the register means.

* * * * *